United States Patent [19]

Bowes

[11] Patent Number: 4,872,968

[45] Date of Patent: Oct. 10, 1989

[54] CATALYTIC DEWAXING PROCESS USING BINDER-FREE CATALYST

[75] Inventor: Emmerson Bowes, East Amwell, N.J.

[73] Assignee: Mobil Oil Corporation, New York, N.Y.

[21] Appl. No.: 87,197

[22] Filed: Aug. 20, 1987

[51] Int. Cl.$^4$ ............................................. C10G 47/20
[52] U.S. Cl. ..................................... 208/111; 208/18; 208/89; 208/120
[58] Field of Search .................. 208/111, 120, 18; 585/739

[56] References Cited

U.S. PATENT DOCUMENTS

| | | | |
|---|---|---|---|
| 4,402,867 | 9/1983 | Rodewald | 502/64 |
| 4,430,200 | 2/1984 | Shihabi | 208/120 |
| 4,443,554 | 4/1984 | Dessau | 502/71 |
| 4,501,926 | 2/1985 | La Pierre et al. | 585/739 |
| 4,510,045 | 4/1985 | Dessau | 208/111 |
| 4,555,495 | 11/1985 | Krishnamurthy | 502/50 |
| 4,582,815 | 4/1986 | Bowes | 502/64 |
| 4,668,377 | 5/1987 | Chen et al. | 208/111 |
| 4,711,710 | 12/1987 | Chen et al. | 208/120 |

FOREIGN PATENT DOCUMENTS

| | | | |
|---|---|---|---|
| 0152485 | 8/1985 | European Pat. Off. | 208/111 |
| 60-255892 | 12/1985 | Japan | 208/111 |

*Primary Examiner*—Anthony McFarlane
*Attorney, Agent, or Firm*—Alexander J. McKillop; Charles J. Speciale; Richard D. Stone

[57] ABSTRACT

A catalytic dewaxing process in which a waxy hydrocarbon feed is dewaxed over binder-free zeolite dewaxing catalyst. The absence of binder reduces catalyst aging especially when operating at controlled space velocities in the range of 0.25 to 1.5 LHSV. The process is especially useful with lube oil stocks where aging problems are particularly severe, typically highly waxy stocks or stocks containing high levels of nitrogen. Preferred catalysts are the intermediate pore size zeolites such as ZSM-5, ZSM-11 and ZSM-23.

5 Claims, 2 Drawing Sheets

CATALYTIC DEWAXING PROCESS USING BINDER-FREE CATALYST

FIELD OF THE INVENTION

This invention relates to catalytic dewaxing.

BACKGROUND OF THE INVENTION

Dewaxing processes of various kinds are widely used in the pertroleum refining industry to improve the fluidity at low temperatures of various petroleum fractions, including fuels such as jet fuel, kerosene, home heating oil, diesel fuel as well as lubricants, where the necessity of procuring good low temperature performance is particularly pressing because the paraffinic nature of lubricants coupled with the high molecular weight of the lubricant fractions generally implies a relatively high wax content which will lead to poor low temperature performance unless adequate remedial measures are taken. Originally, dewaxing was carried out by physical techniques, especially solvent dewaxing using solvent mixtures such as MEK/toluene or by autorefrigerant processes such a propane dewaxing. More recently, however, catalytic dewaxing processes have established themselves commercially. Catalytic dewaxing processes are available both for fuels and for lubricants. The Mobile Distillate Dewaxing process (MDDW) is useful with fuels such as jet fuel and diesel fuel and the Mobile Lube Dewaxing process (MLDW) with lubricants, including distillate (neutral) and residual (bright stock) types. The MDDW and MLDW processes both employ shape-selective cracking to remove waxy components, mainly normal and slightly branched chain paraffins, from the feed to produce a dewaxed product having a reduced pour point which is dependent on the severity of the processing. The MLDW process employs a second reactor containing a hydrofinishing catalyst which ensures that the dewaxed lube product meets all applicable quality and engine performance criteria, as described in "*Industrial Application of Shape-Selective Catalysis*": *Catal. Rev.-Sci. Eng.* 28 (2-3) 185-264 (1986), especially page 244. See also *Refining Process Handbook* (Hydrocarbon Processings, September, 1986), pages 89,90 and, as an example of an early proposal in this field, *Oil and Gas Journal*, 6 January 1975, pages 69-73.

Catalytic dewaxing processes selectively remove the longer chain, waxy paraffins, mainly n-paraffins and mono-methyl paraffins from the feed. Most processes of this type operate by selectively cracking the waxy paraffins to produce lower molecular weight products which may then be removed by distillation from the higher boiling lube stock. The catalysts which have been proposed for this purpose have usually been zeolites which have a pore size which admits the straight chain, waxy n-paraffins either alone or with only slightly branched chain paraffins but which exclude the less waxy, more highly branched materials and cycloaliphatics. Zeolites such as ZSM-5, ZSM-11, ZSM-12, ZSM-22, ZSM-23, ZSM-35 and ZSM-38 have been proposed for this purpose in dewaxing processes, as described in U.S. Pat. Nos. Re 28,398 (3,700,585); 3,582,189; 3,894,938; 4,176,050; 4,181,598; 4,222,855; 4,229,282; 4,287,388; 4,259,170; 4,283,271; 4,283,272; 4,357,232 and 4,428,819 to which reference is made for details of such processes. A dewaxing process employing synthetic offretite is described in U.S. Pat No. 4,259,174. A process using a mixture of zeolites of different pore sizes is disclosed in U.S. Pat. No. 4,601,993. Reference is made to those patents for details of such processes.

The catalytic dewaxing processes using intermediate pore size zeolites such as ZSM-5 operate, as described above, by selectively cracking the waxy components of the feed. This results in a loss in yield since the components which are in the lube boiling range undergo a bulk conversion to lower boiling fractions which, although they may be useful in other products, must be removed from the lube stock. Another approach to processing of lube stocks is described in U.S. Pat. Nos. 4,419,220 and 4,518,485, in which the waxy components of the feed, comprising straight chain and slightly branched chain paraffins, are removed by isomerization over a catalyst based on zeolite beta. During the isomerization, the waxy components are converted to relatively less waxy isoparaffins and at the same time, the slightly branched chain paraffins undergo isomerization to more highly branched aliphatics. A measure of paraffin cracking does take place during the operation so that not only is the pour point reduced by reason of the isomerization but, in addition, the heavy ends undergo some cracking or hydrocracking to form liquid range materials which contribute to a low viscosity product. The degree of cracking is, however, limited so as to maintain as much of the feedstock as possible in the desired boiling range.

The catalysts used in these processes have invariably included a binder in addition to the zeolite, at least when the process was to be operated on a commercial scale. There is a number of reasons for this. First, in a commercial scale unit, a considerable depth of catalyst is maintained in the conventional trickle-bed, downflow reactor so that the catalyst at the bottom of the bed requires significant crushing resistance to withstand the weight of catalyst above. It also requires considerable attrition resistance to withstand the stresses of handling during manufacture and loading into the unit. A further consideration is that is should be practicable to produce the catalyst in the desired particle size and shape using conventional equipment and this requirement generally implies that the catalyst should be capable of being produced by extrusion.

Extrusion is one way of obtaining a material which has a high degree of strength for various applications, both catalytic and noncatalytic. Some aluminosilicates zeolites have long been used as catalysts for a wide variety of organic conversion processes and, in general, crystalline aluminosilicate zeolites are incorporated with a matrix or binder material in order to impart strength to them. The most commonly used matrix materials have included alumina and mixtures of alumina with clays because these materials were very easy to extrude and resulted in the production of an extrudate which had desirable physical strength.

Silica is known to be a desirable matrix and posesses advantages over alumina in certain catalytic reaction. For example, U.S. Pat. No. 4,013,732 discloses ZSM-5 with a silica matrix, see Column 7. U.S. Pat. No. 3,843,741 and U.S. Pat. No. 3,702,886 would broadly teach the use of ZSM-5 with a silica matrix. Thus, although it was considered desirable to composite ZSM-5 with a silica matrix, it was not possible to do this by an extrusion because silica and zeolites will not extrude in conventional extruding equipment to give reasonably strong products. The only way that composites of ZSM-5 and silica could be made was by a pilling or pelleting which involved mixing silica and the appropriate zeolite and squeezing it together to form a shaped structure having minimum physical strength.

Catalysts may be produced from silica gels. U.S. Pat. No. 3,969,274 describes the advantages of having silica as a support for catalysts but utilizes a silica gel which has been subjected to steam treating in order to enhance its crush strength. A steaming step is stated to be required in order to make the process operable.

Silica-zeolite pellets or extrudates may be treated with various materials in order to increase their strength. For example, U.S. Pat. No. 3,846,337 discloses silica-bound silicate particles of improved crush strength which can be prepared by admixing reactive silica sols with siliceous particles, and contacting the resulting combination with ammonium phosphate, an acid phosphate or both.

U.S. Pat. No. 4,111,843 describes the preparation of porous silica particles by adding excess alkali to a water glass and then precipitating a hydrogel with acid. The acess alkali is stated to be responsible for increasing pore diamter. The patent discloses (Column 2, line 15), that the extrudability of microporous silica-alumina catalyst carriers of exceptional strength can be achieved by following the process of the patent. However, the patent does not disclose anything with regard to extrudates of silica particles, (see Column 6, line 66 and following).

U.S. Pat. No. 4,582,815 and its corresponding European Publication No. 167324 disclose a method for making extrudates of exceptional strength, by mulling either pure silica, or a crystalline aluminosilicate zeolite, or more preferably, a mixture of silica with a crystalline aluminosilicate zeolite with water to a solids level of 25 to 75 percent in the presence of 0.25 to 10 weight percent of a basic material such as sodium hydroxide (calculated as solid sodium hydroxide and based on the total solids present).

It is theorized in U.S. Pat. No. 4,582,815 that the successful extrusion or formation of shaped bodies by wetting and compressing powders requires that the particles be capable of being brought into close proximity with each other so that the van der Waals forces become operative in subsequently holding the particle together. Chemical binding by crosslinking may also occur for some binders but the initial requirement is still for close packing. Highly siliceous materials like silica and zeolites of high silica-to-alumina ratios are hydrophobic. It has been discovered that by substituting an alkali metal for hydrogen in the silanol groups on the outside surfaces of siliceous materials they can generally thereby be made more easily extrudable with crush strengths far exceeding those heretofore described for silica-bound materials.

SUMMARY OF THE INVENTION

It has now been found that in catalytic dewaxing processes, the aging rate of the catalyst may be reduced by almost an order of magnitude by forming the partiles of the dewaxing catalyst entirely from the zeolite which effects the dewaxing, that is, the catalyst particles are formed from the zeolite without any added binder. The binder-free catalysts have a significant advantage over catalysts prepared by binding the zeolite with a matrix-forming oxide such as silica or alumina. The substantially reduced aging rates obtained with the binder-free catalysts enable cycle lengths to be increased with a greater stream factor and less down-time related to catalyst reactivation or regeneration. In addition, adverse side reactions catalysed by the binder are eliminated and the dewaxed products may be found to possess improved oxidation stability.

According to the present invention there is therefore provided a catalytic dewaxing process in which a waxy hydrocarbon feed is catalytically dewaxed by means of a dewaxing catalyst comprising a binder-free zeolite having dewaxing activity. In most cases, the zeolite will be an intermediate pore size zeolite having acidic functionality, preferably ZSM-5, ZSM-11 or ZSM-23 although other zeolites may also be employed. The catalyst will normally be employed in the form of an extrudate i.e. a solid particle produced by a process of extrusion.

DETAILED DESCRIPTION

The present dewaxing process dewaxes a variety of waxy hydrocarbon feeds including distillate and residual products. The lower boiling feeds include distillates with components boiling above the gasoline boiling range, i.e. usually about 330° F.+ (165° C.+) or higher, for example 365° F.+ (185° C.+) or 385° F.+ (195° C.+). Middle distillates of this kind include jet fuel, home heating oil, kerosene and diesel fuel. The end point of middle distillates of this kind is typically not higher than 650° F. (345° C.) but depending on the product in question, lower or higher end points may be encountered and again, initial boiling points extending into the naphtha range may be encountered with some products, especially jet fuels such as JP-4. Higher boiling products may also be dewaxed by the present process, including gas oils, fuel oils and lubricants. Products of this kind usually have an initial boiling point of at least 600° F. (315° C.) and more usually 650° F. (345° C.). End points of about 1050° F. (565° C.) are typical for high boiling distillates but residual products will include components boiling above this value or which are essentially non-distillable, at least under conventional refinery distillation conditions. Lubricants are a special class of hydrocarbon fractions which may be dewaxed by the present process since catalyst aging problems have been most severe with lube feeds.

Lubricant feeds boil in the lube boiling range, i.e. 600° F.+ (315° C.+) and usually 650° F.+ (345° C.+) and are of suitable lubricating characteristics. They are conventionally produced by the vacuum distillation of a fraction from a crude source of suitable type. Generally, the crude will be subjected to an atmospheric distillation and the atmospheric residuum (long resid) will be subjected to vacuum distillation to produce the initial lube stocks. The vacuum distillate stocks or "neutral" stocks are generally highly paraffinic fractions of relatively low viscosity ranging typically from 100 SUS (20 cST) at 40° C. for a light neutral to about 750 SUS (160 cST) at 40° C. for a heavy neutral. The vacuum resid may be used as a source of more viscous lubes after deasphalting, usually be propane deasphalting (PDA) followed by solvent extraction to remove undesirable, high viscosity, low V.I. aromatic omponents, using a solvent which is selective for aromatics such as furfural, phenol, or dimethylformamide. The raffinate is generally referred to as Bright Stock and typically has a viscosity of 1000 to 3000 SUS at 100° C. (210 to 610 cST). The neutral fractions may also be subjected to solvent extraction to improve their V.I. and other qualities by selective removal of the aromatics.

Lube feeds may also be obtained by other procedures whose general objective is to produce an oil of suitable lubricating character from other sources, including marginal quality crudes, shale oil, tar sands and/or synthetic stocks from processes such as methanol or olefin conversion or Fischer-Tropsch synthesis. The lube hydrocracking process is especially adapted to use in a refinery for producing lubricants from asphaltic or other marginal crude sources because it employs conventional refinery equipment to convert the relatively aromatic (asphaltic) crude to a relatively paraffinic lube range product by hydrocracking. Integrated all-catalytic lubricant production processes employing hydrocracking and dewaxing are described in U.S. Pat. Nos. 4,414,097; 4,283,271; 4,283,272; 4,383,913; 4,347,121; 3,684,695 and 3,755,145. Processes for converting low molecular weight hydrocarbons and other starting materials to lubestocks are described, for example, in U.S. Pat. Nos. 4,547,612; 4,547,613; 4,547,609; 4,517,399 and 4,520,221, to which reference is made for a description of these processes.

The present dewaxing process is of particular utility with lube feeds which, by reason of their characteristics, have an extremely adverse affect on the catalyst aging rate. Feeds of this type typically include highly paraffinic, highly waxy feeds such as those derived from Libyan or Pacific Basin crude sources. Feeds of this type normally include at least 25 weight percent paraffins or more, for example, at least 35 or even at least 50 weight percent paraffins. The rapid catalyst aging associated with feeds of this type is believed to be caused by the rapid accumulation of coke during the cracking of the large quantity of waxy components in feeds of this type. A typical feed of this type is the Minas (Indonesian) gas oil whose composition is given in Table 1 (raw) and Table 2 (hydrotreated) below. A paraffinic North Sea feed has its composition shown in Table 3 below.

TABLE 1

| Minas Gas Oil | |
|---|---|
| Nominal boiling range, °C. (°F.) | 345°–540° (650°–1000°) |
| API Gravity | 33.0 |
| Hydrogen, wt pct | 13.6 |
| Sulfur, wt pct | 0.07 |
| Nitrogen, ppmw | 320 |
| Basic Nitrogen, ppmw | 160 |
| CCR | 0.04 |
| Composition, wt pct | |
| Paraffins | 60 |
| Naphthenes | 23 |
| Aromatics | 17 |
| Bromine No. | 0.8 |
| KV, 100° C., cSt | 4.18 |
| Pour Point, °C. (°F.) | 46 (115) |
| 95% TBP, °C. (°F.) | 510 (950) |

TABLE 2

| HDT Minas Feed | |
|---|---|
| Nominal boiling range, °C. (°F.) | 345–510 (650–950) |
| API Gravity | 38.1 |
| H, wt pct | 14.65 |
| S, wt pct | 0.02 |
| N, ppmw | 16 |
| Pour Point, °C. (°F.) | 38 (100) |
| KV at 100° C., cSt | 3.324 |
| P/N/A wt pct | |

TABLE 2-continued

| HDT Minas Feed | |
|---|---|
| Paraffins | 66 |
| Naphthenes | 20 |
| Aromatics | 14 |

NOTE: Hydrotreated over Ni—Mo/Al$_2$O$_3$ hydrotreating catalyst, 800 psig H$_2$, 710°–735° F., 1 LHSV, 712 l.l.$^{-1}$ hydrogen:feed ratio.

TABLE 3

| HDT North Sea Gas Oil | |
|---|---|
| Nominal boiling range, °C. | 345–455 (650–850) |
| API Gravity | 31.0 |
| H, wt pct | 13.76 |
| S, wt pct | 0.012 |
| N, ppmw | 34 |
| Pour Point, °C. (°F.) | 32 (90) |
| KV at 100% cst | 4.139 |
| P/N/A wt pct. | |
| Paraffins | 30 |
| Naphthenes | 42 |
| Aromatics | 28 |

The waxy nature of a feed is indicated, of course, by poor fluidity properties such as pour point or freeze point. Pour point is a particularly good measure of waxiness. Feeds with pour points above about 100° F. (about 40° C.) e.g. 110° F. or higher (about 43° C. or higher) are paricularly apt for treatment in the present process because feeds of this type have typically given substantial aging problems with more conventional catalytic dewaxing processes. Highly waxy feeds of this type typically include feeds derived, as mentioned above, from Libyan and Pacific Basic crude sources including mainland Chinese sources but they may also have other origins, for example, Kirkuk lube feeds have high pour points, typically above 110° F. (about 43° C.) e.g. 114° C. (46° C.) and they usually cause rapid aging in conventional alumina-bound dewaxing catalysts. The present binder-free dewaxing catalyst, on the other hand, enables feeds of this kind to be dewaxed with long effective cycle lengths.

Another class of lube range feeds with which the present process is particularly useful are the feeds which contain large quantities of contaminants, especially of heteroatoms such as nitrogen and sulfur. Feeds of this type generally cause rapid catalyst aging because the contaminants block the acidic sites on the catalyst and, for this reason, basic contaminants e.g. basic nitrogen are particularly troublesome, especially when coupled with high paraffin levels as with certain mainland Chinese feeds. Basic nitrogen levels of 100 ppm or higher e.g. 200 or 400 ppm are associated with rapid aging particularly at paraffin contents above 25 weight percent and feeds of this type are particularly apt to be treated by the present process.

The compositions of two mainland Chinese origin lube feeds of this type are set out in Tables 4 and 5 below. Table 4 gives the properties of a waxy heavy neutral of mainland Chinese origin, and Table 5 gives the properties of a propane deasphalted resid.

TABLE 4

| Heavy Neutral Properties | |
|---|---|
| SP.Gr., 15/4° C. | 0.8826 |
| Viscosity, cSt @ 100° C. | 11.4 |
| @ 150° C. | 4.49 |
| Pour Point, °C. | 57.5 |
| Color (ASTM) | D8.0 |
| Flash Point (C.L.), °C. | 288 |

TABLE 4-continued

Heavy Neutral Properties

| | |
|---|---|
| Total Nitrogen, ppmw | 1000 |
| Basic Nitrogen, ppmw | 460 |
| Sulfur, ppmw | 1100 |
| Carbon, wt pct | 86.37 |
| Hydrogen, wt pct | 13.38 |
| RCR, wt pct | 0.38 |
| R.I. @ 70° C. | 1.47 |
| Oil Content, wt pct | 63.4 |
| Aniline Point, °C. | 115.6 |
| Distillation (D8-1160), °C. | |
| IBP/5 vol pct | 201/451 |
| 10/20 | 467/486 |
| 30/40 | 496/505 |
| 50/60 | 513/522 |
| 70/80 | 532/542 |
| 90/95 | -/- |
| Aromatic Fraction (fa)* | 0.067 |

*Calculated by The Densimetric Method

TABLE 5

PDA Resid

| | |
|---|---|
| SP.Gr., 15/4° C. | 0.8875 |
| Viscosity, cSt @ 100° C. | 24.3 |
| @ 150° C. | 8.41 |
| Pour Point, °C. | 50.0 |
| Color (ASTM) | D8.0 |
| Flash Point (C.L.), °C. | 306 |
| Total Nitrogen, ppmw | 1200 |
| Basic Nitrogen, ppmw | 580 |
| Sulfur, ppmw | 1000 |
| Carbon, wt pct | 86.39 |
| Hydrogen, wt pct | 13.42 |
| RCR, wt pct | 0.68 |
| R.I. @ 70° C. | 1.4719 |
| Oil Content, wt pct | 52.8 |
| Aniline Point, °C. | 130.8 |
| Distillation (D8-1160), °C. | |
| IBP/5 vol pct | 309/486 |
| 10/20 | 516/552 |
| 30/40 | -/- |
| Aromatic Fraction (fa)* | 0.055 |

*Calculated by The Densimetric Method

The improvements in catalyst aging rate are noted most with the feedstocks which present the greatest difficulties in processing with conventional alumina-bound catalyst. Aging problems have been severe when operating with particular stocks and alumina-bound dewaxing catalysts and accordingly, the present self-bound catalyst afford a solution when these problems are encountered. The present dewaxing process is of significant utility with lube feeds which have an initial boiling point of at least 750° F. (about 400° C.) and of especial utility with those having an initial boiling point of 775° F. (about 415° C.) and a 50% point of at least 850° F. (about 455° C.) or higher (ASTM method D-1160). Residual type feeds such as bright stocks which have presented processing difficulties will benefit from the use of the present catalysts. Feeds of this type have an IBP of at least 750° F. (about 400° C.), usually at least 775° F. (about 415° C.) with a 50% point of at least 950° F. (about 510° C.), usually at least 1000° F. (about 540° C.) by ASTM method D1160-1 (1 mm Hg).

Prior to the catalytic dewaxing the feed may be subjected to hydrotreating under conventional conditions, if necessary, to remove heteroatoms and possibly to effect some aromatics saturation.

The dewaxing catalyst comprises particles of a zeolite having dewaxing capability, i.e., the capability of selectively removing waxy hydrocarbon components from the feed. The preferred zeolites for this purpose are the intermediate pore size zeolites which are characterized by a Constraint Index of 1 to 12, as described in *J. Catalysis* 67, 218–222 (1981). As described there, a Constraint Index of 1 to 12 is related to the structure of the zeolite and is associated with zeolites which have a channel system with windows of 10-membered rings although constrained, shape-selective cracking is also observed with other structures such as that of TMA offretite. In fact, TMA offretite may be more selective in its dewaxing than some of the true intermediate pore size (10-ring) zeolites such as ZSM-5, as noted in "TMA Offretite: Relationship Between Structure and Catalytic Properties", Chen et al, *J. Catalysis* 86, 24–31 (1984). The utility of a zeolite for shape selective dewaxing is therefore appropriately determined by the Constraint Index rather than structure since this is a measure of shape-selective properties. The method by which Constraint Index is to be determined is described in U.S. Pat. No. 4,016,218, to which reference is made for a description of the method.

Constraint Index (C.I.) values for some typical materials are given in Table 6 below:

TABLE 6

Constraint Index

| | CI | (at test temperature) |
|---|---|---|
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The nature of the Constraint Index parameter and the technique by which it is determined admit of the possibility that a given zeolite can be tested under different conditions to give different values of Constraint Index. Constraint Index seems to vary with severity of operation (conversion) and the presence or absence of binders. Likewise, other variables, such as crystal size of the zeolite, the presence of occluded contaminants, etc., may affect the Constraint Index. It is therefore possible so to select test conditions, e.g. temperature, as to establish more than one value for the Constraint Index of a particular zeolite. This explains the range of Constraint Indices for some zeolites, such as ZSM-5, ZSM-11 and Beta.

The above CI values typically characterize the specified zeolites, but the specified values are the cumulative result of several variables in the determination and calculation of the index. Thus, for a given zeolite exhibiting a CI value within the range of 1 to 12, depending on the temperature employed during the test method within the range of 290° C. to about 538° C., with accompanying conversion between 10% and 60%, the CI may vary. Likewise, other variables such as the crystal size of the zeolite, the presence of possibly occludes contaminants and binders intimately combined with the zeolite may affect the CI. The determination of CI therefore affords a means for characterizing the zeolites of interest which is approximate, taking into consideration the manner of its determination, with the possibility, in some instances, of compounding variable extremes. However, in all instances, at a temperature within the above-specified range of 290° C. to about 538° C., the CI will have a value within the approximate range of 1 to 12 for the preferred class of zeolites which exhibit shape-selective dewaxing characteristics. The intermediate pore size zeolites perform the shape-selective dewaxing by selectively cracking the waxy components of the feed, as mentioned above and as described in greater detail in "Industrial Application of Shape-Selective Catalysis", Chen et al., Catal. Rev.-Sci.Eng. 28 (2 and 3), 185–264 (1986), especially 199–208, 241–247, to which reference is made for a description of these dewaxing processes. Intermediate pore size zeolites which may be used for catalytic dewaxing include ZSM-5, ZSM-11, ZSM-22, ZSM-23, ZSM-48 and synthetic ferrierites such as ZSM-35 and ZSM-38. Of these ZSM-5 and ZSM-11 are preferred, although ZSM-23 and synthetic ferrierties such as ZSM-35 and ZSM-38 provide highly shape-selective dewaxing properties by reason of the highly constrained access which they provide for paraffinic species. Because the dewaxing proceeds by a shape-selective cracking mechanism, no metal component on the catalyst is needed but a metal component such as nickel or palladium, having hydrocarbon functionality may optionally be present because such components may improve removal of coke during catalyst reactivation. Up to about 5 wt. % metal is sufficient, typically about 1 wt. % being satisfactory for this purpose.

It has also been found that dewaxing may be effected by a process of isomerizing of the waxy paraffinic components, mainly normal and slightly branched chain paraffins, to less waxy iso-paraffinic components which also possess high viscosity indices. This process has the potential for improved yield since the undesired waxy components are not removed from the appropriate product boiling range by cracking but, rather, by isomerization to acceptable product components within the same boiling range. Zeolite beta is effective for dewaxing in this way. Catalytic dewaxing processes employing zeolite beta are described in U.S. Pat. Nos. 4,419,220 and 4,518,485 to which reference is made for a description of such processes.

In general terms the catalytic dewaxing processes are operated under conditions of elevated temperature, usually ranging from about 400° to 800° F. (205° to 425° C.), but more commonly from 500° to 700° F. (260° to 370° C.), e.g. 600° to 700° F. (315° to 370° C.), depending on the dewaxing severity necessary to achieve the target pour point, with the temperature increasing in each dewaxing cycle to compensate for decreasing catalyst activity. Hydrogen is not required stoichiometrically but promotes extended catalyst life by reductive coke removal. The process is therefore carried out in the presence of hydrogen, usually at relatively low pressure below 1000 psig (7000 kPa) and typically 400–800 psig (2860 to 562 kPa, abs.). Hydrogen circulation rate is typically 1000–4000 SCF/bbl, usually 2000 to 3000 SCF/bbl (about 180 to 710, usually 355 to 535 n.l.l.$^{-1}$). Space velocity will vary according to the chargestock and the severity needed to achive the target pour point but is typically in the range of 0.5 to 5 LHSV (hr$^{-1}$), usually 1 to 2 LHSV.

The dewaxing process is operated cyclically with the catalyst being subjected to restorative treatment from time to time to restore its dewaxing activity and selectivity. Catalyst deactivation occurs progressively during each dewaxing cycle between successive restorative treatments, mainly by the accumulation of coke and inhibitors on the catalyst. Restorative treatment may be either oxidative, by treatment with oxygen-containing gas at elevated temperature to remove coke and other inhibitors or, alternatively, by treatment with hydrogen at elevated temperature. Conditions for oxidative and reductive treatments are well eastablished in such processes. Oxidative regeneration treatments are described, for example, in U.S. Pat. Nos. 3,069,362 and 3,069,363 and G.B. Patent No. 1,148,545. Hydrogen reactivation treatments are described, for example, in U.S. Pat. Nos. 4,358,395, 4,508,836 and 4,560,670.

The dewaxing may be carried out in conventional equipment, suitably in a fixed-bed, downflow, trickle reactor. Commerical reactors of this kind typically employ a catalyst bed 5 m. deep with a diameter depending upon the capacity of the unit and the space velocity desired for the feed being used and the target pour point.

The present process employs a particular dewaxing catalyst which consists essentially of the zeolite. No binder is used. It has been found that when the zeolite if extruded without binder, unexpectedly low aging rates are achieved.

Although it would be expected that longer dewaxing runs could be achieved by eliminating the binder (because an increased amount of zeolite can be accommodated within a given reactor volume), the improvements which have been observed exceed the expected magnitudes by a significant amount. Current commercial dewaxing catalysts typically employ 35 wt. % alumina binder and so, compared to such catalysts, the amount of zeolite which can be placed in an existing reactor is increased by about one half (100/65). A corresponding increase in cycle length would therefore be expected but it has been found that the extension in the duration of the dewaxing cycle between successive restorative treatments (typically hydrogen reactivation or oxidative regeneration) is greater than this and is largely to be attributed to the absence of the alumina binder. Although the alumina binder used for the catalysts has low acidity and therefore might not be expected to participate in non-shape-selective catalytic cracking reactions, it does nevertheless have a deleterious effect which is overcome by the use of the present unbound zeolite catalysts. The catalyst aging rate which have been observed with the present unbound catalysts are typically five to twelve times less than the rates achieved with otherwise comparable catalysts with an alumina binder, resulting in corresponding improvements in cycle duration.

The fact that the improvements in catalyst aging rate are real and substantial is demonstrated by comparison of the relative aging rates of the alumina-bound and unbound catalysts at comparable space velocities (LHSV) relative to the zeolite component. Reducing the space velocity on any dewaxing catalyst results in an improvement in aging but the improvements obtained with the present binder-free catalysts are better than would be expected on this basis of comparison.

A direct comparison between the alumina-bound and unbound catalysts with typical heavy neutral feeds indicates that the unbound catalyst achieves a reduction of 65 to 90 percent in the aging rate using the same zeolitic dewaxing component (on the same feedstock for the same product pour point and with otherwise identical process conditions e.g. space velocity). In practice, the space velocity (LHSV) will be from 0.1 to 3 hr.$^{-1}$, more usually 0.25 to 1.5 hr.$^{-1}$. Space velocities within this range are applicable even with chargestocks which are difficult to process with conventional alumina bound catalysts. The exact value of the space velocity should be selected according to the characteristics of the feed although, as a generalization, the space velocity should be towards the lower end of this range for the higher boiling feeds such as bright stock and at the higher end for distillate feeds such as the neutral lubestocks and distillate fuels. In all cases where practical comparisons are made at equal process rates over the same volume of catalyst (same LHSV), the binder-free catalyst give substantially lower aging rates. Certain lubestocks which cannot be dewaxed successfully or economically with alumina-bound catalysts are quite amenable to treatment at practicable space velocities with the binder-free catalyst.

The improvements in aging rate obtained with the unbound catalysts are most marked at higher temperatures. Normally the temperature of the catalyst bed is raised progressively as the dewaxing cycle continues in order to compensate for the progressive deactivation of the catalyst. At higher temperatures, however, the oxidation stability of the dewaxed products decreases so that a limit is imposed on the extent to which cycle life can be extended by the expedient of increasing temperature. The present catalysts, however, produce products of superior oxidation stability especially at the higher temperatures characteristic of the end of the dewaxing cycle. In addition, the absence of the alumina binder is expected to improve dewaxing selectivity at higher temperatures so that it may be possible to extend the dewaxing cycle by continuing to raise the temperature beyond the point which would be acceptable with a conventional alumina-bound catalyst (with the same feed and product pour point), without excessive losses in yield or oxidation stability. During each dewaxing cycle the improvement in aging rate will become more apparent during the second half of the cycle as the higher temperatures are reached; for this reason, the progressive increase in temperature required to compensate for catalyst deactivation may be less in the second half of the cycle than in the first so that cycle duration may be extended by the reduced aging rate, especially during the second half of the cycle.

It is tentatively theorised that in the absence of a reactive binder, the aging mechanism is one which involves random plugging of the pores of the catalyst. With conventional alumina-bound dewaxing catalysts, it is the aging caused by the alumina that apparently causes loss of activity and sensitivity even though the alumina is substantially inert. It is conceivable that the plugging which does take place is on the alumina itself and in the pores between the alumina and the zeolite so that, regardless of the continued viability of the zeolite, access to it by the feed is no longer possible. By eliminating the binder, the true aging rate of the zeolite becomes manifest and may be effectively exploited.

The unbound (or, alternatively, self-bound) dewaxing catalysts used in the present process are suitably produced by the extrusion method described in U.S. Pat. No. 4,582,815, to which reference is made for a description of the method and of the extruded products obtained by its use. The method described there enables extrudates having high crush strength to be produced on conventional extrusion equipment and accordingly, the method is eminently suitable for producing the present catalysts which are silica-rich by reason of the silica content of the zeolite. The catalysts are produced by mulling the zeolite, as described in U.S. Pat. No. 4,582,815, with water to a solids level of 25 to 75 wt. % in the presence of 0.25 to 10 wt. % of basic material such as sodium hydroxide (calculated as solid basic material, based on total solids present). Further details are to be found in U.S. Pat. 4,582,815.

The catalysts are used in the form of extruded shaped particles. The particles may be cylindrical, or polygonal e.g. square, rectangular, hexagonal, in cross section or any other shape which lends itself to formation by extrusion. Lobed shapes are particularly useful e.g. trilobe (cloverleaf) or quadrulobe. In any event, it is preferred to use extrudates which have a maximum diffusion distance of not more than 0.025 inch (0.63 mm), preferably not more than 0.02 inch (0.51 mm) although larger size extrudates may be used in bigger reactors e.g. 0.03125 inch (0.8 mm). Catalysts of this type are particularly useful for dewaxing residual feeds, for example, feeds with an IBP of at least 700° F. (370° C.) and a 50 vol. percent boiling point of at least 900° F. (480° C.). The use of shaped catalysts of this kind for dewaxing high boiling feeds is described in U.S. application Ser. No. 938,214, filed 5 Dec. 1986 and its counterpart EU No. 1,681,146, to which reference is made for details of such a process. The use of quadrulobe catalysts is described in U.S. Pat. No. 4,016,067, of trilobed catalysts in U.S. Pat. No. 3,674,680 and various other polylobular catalysts in U.S. Pat. Nos. 4,118,310, 4,208,227, 3,764,565 and 3,966,644. The use of hollow catalyst particles is described in U.S. Pat. No. 4,441,990. Reference is made to these disclosures for details of such shaped catalysts which may be used in the present process.

In order to improve the quality of the dewaxed lube products, a hydrotreating step may follow the catalytic dewaxing in order to saturate lube range olefins as well as to remove heteroatoms, color bodies and, if the hydrotreating pressure is high enough, to effect saturation of residual aromatics. Generally, however, the post-dewaxing hydrotreating is carried out in cascade with the dewaxing step so that the relatively low hydrogen pressure of the dewaxing step will prevail during the hydrotreating and this will generally preclude a significant degree of aromatics saturation. Generally, the hydrotreating will be carried out at temperatures from about 400° to 600° F. (about 205° to 315° C.), usually with higher temperatures for residual fractions (bright stock), for example. about 500° to 575° F. (about 260° to 300° C.) and lower temperatures for the neutral stocks, for example, about 425° to 500° F. (about 220° to 260° C.). System pressures will correspond to overall pressures typically from 400 to 1000 psig (2860 to 7000 kPa, abs.) although lower and higher values may be employed. Space velocity in the hydrotreater is typically from 0.1 to 5 LHSV (hr $^{-1}$), and in most cases from 0.5 to 1 hr$^{-1}$.

Processes employing sequential lube catalytic dewaxing-hydrotreating are described in U.S. Pat. Nos. 4,181,598; 4,137,148 and 3,894,938. A process employing a reactor with alternating dewaxing-hydrotreating beds is disclosed in U.S. Pat. No. 4,597,854. Reference is made to these patents for details of such processes.

The hydrotreating catalysts which may be used before and after the dewaxing comprises a hydrogenation component on a porous support. Because the desired hydrogenation reactions require no acidic functionality and because no conversion to lower boiling products is desired in this step, the support is substantially non-acidic in character. Suitable supports include alumina, silica and silica-alumina. The hydrogenation component is typically a base metal of Groups VIA or VIIIA (IUPAC Table) such as nickel, cobalt, molybdenum or tungsten but may also be a noble metal such as palladium or platinum. Combinations of base metals such as cobalt-molybdenum, nickel-molybdenum are particularly favored. Hydrotreating catalysts of this type are commercially available.

EXAMPLE 1

A 0.5 inch (12.5 mm.) diameter reactor was packed with 15 ml of ½ in. (1 mm.) diameter cylindrical extrudate of ZSM-5 containing no added binder (packing density 0.62 g./ml). The space above and below the catalyst was packed with quartz to improve the flow and and temperature profile. A bright stock raffinate of Arab Light crude origin was pumped over the catalyst at the rate of 15 ml/hour (1 LHSV) while the temperature was maintained at a value sufficient to produce a dewaxed oil of 20° F. (−7° C.) pour point as measured by ASTM D-97. The run was arbitrarily stopped at 676° F. (358° C.) after 333 days on stream. The starting temperature, corrected for irregularities of pour point at start up was 535° F. (279° C.). The average aging rate was 0.43° F./day (0.24° C./day). The comparable aging rate for a comparable ZSM-5 dewaxing catalyst with 35% alumina binder catalyst, (65% zeolite) is 5° F./day (2.8° C./day) or 12 times faster.

An aging rate comparison was made for a heavy neutral lube stock (700 SUS) of North Sea origin. The properties of the feed are given in Table 7 below.

TABLE 7

| North Sea HN | | |
|---|---|---|
| Pour Point, °F. | | 120 |
| K.V. @ 100° C. | | 11.38 |
| K.V. @ 300° F. | | 4.39 |
| Bromine No. | | 0.80 |
| Refractive Index @ 70° C. | | 1.461 |
| Gravity, API | | 30.90 |
| Water-Azeo Distn, ppm | | 20.00 |
| Furfural, ppm | | 2.00 |
| Sulfur, wt % | | 0.17 |
| Basic Nitrogen, ppm | | 90.0 |
| Nitrogen, ppm | | 97.0 |
| Hydrogen, wt % | | 13.52 |
| Ni, ppm | | 0.20 |
| V, ppm | | 0.00 |
| Fe, ppm | | 0.25 |
| Cu, ppm | | 0.26 |
| Na, ppm | | 5.00 |
| Color ASTM Oil | | 0.75 |
| Aniline Point, °F. | | 251 |
| Carbon Residue, % | | 0.10 |
| Distillation | D1160-1 | |
| (vol % Distilled) | IBP, °F. | 733.4 |
| | 5% | 878.7 |
| | 10% | 917.4 |
| | 30% | 961.7 |
| | 50% | 978.9 |
| | 70% | 996.9 |
| | 80% | 1008.3 |
| | 90% | 1027.0 |

TABLE 7-continued

| North Sea HN | | |
|---|---|---|
| | 95% | 1039.8 |
| | End Point | 1058.0 |
| | Pct. Recov | 99% |

The heavy neutral feed was catalytically dewaxed over a ZSM-5 dewaxing catalyst comprising ZSM-5 bound with alumina (65% ZSM-5, 35% alumina) in the form of a 1/32 inch (0.8 mm) cylindrical extrudate. The feed was dewaxed to a constant product pour point of 20° F. (−7° C.) by progressively raising the reactor temperature from a start-of-cycle temperature of about 500° F. (260° C.) to compensate for catalyst aging. Hydrogen pressure was 400 psig (2860 kPa abs.) and the hydrogen circulation rate 2500 SCF/bbl (445 n.l.$^{-1}$l.$^{-1}$). Space velocity relative to the catalyst was 0.5 LHSV, equivalent to 1.2 WHSV relative to the zeolite component. The aging rate was determined to be 7.9° F./day (4.4° C./day), as shown in FIG. 1 (curve A).

Figure 1:
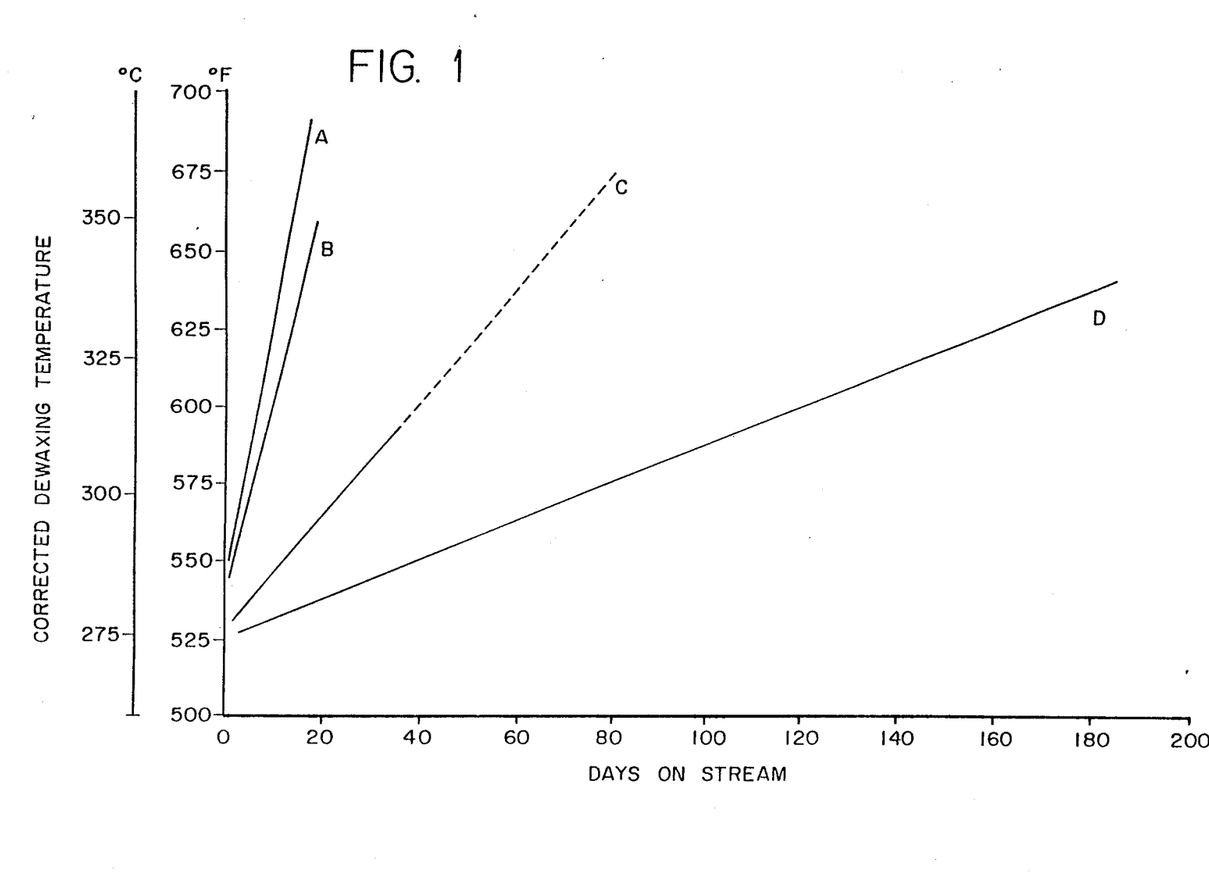
FIGS. 1 and 2 are graphs showing aging comparisons for various dewaxing catalysts described below.

A similar run using a 0.0625 inch (1.6 mm) dia. cylindrical extrudate of alumina-bound ZSM-5 (65% ZSM-5) produced similar results with an aging rate of 6.5° F./day (3.6° C./day), as shown in FIG. 1 (curve B).

When corrected to a WHSV of 0.6 relative to the zeolite component of the dewaxing catalyst, the aging rate is 2.0° F./day (1.1° C./day), as indicated by curve C.

A self-bound (100% zeolite) ZSM-5 dewaxing catalyst having the same alpha value as those used in the above comparisons was used for dewaxing the heavy neutral feed at a space velocity of 0.5 LHSV, 0.67 WHSV relative to the zeolite. The aging rate was found to be 0.7° F./day (0.4° C./day) as indicated by curve D in FIG. 1. Thus, the aging rate of the catalyst is improved to an extent which is greater than that attributable to the different in space velocity between the bound catalyst and the unbound catalyst (compare curves C and D). Note that if the end-of-cycle (EOC) temperature is set at 675° F. (360° C.) to avoid excessive non-selective cracking, the alumina-bound catalyst will achieve a cycle length of only about 20 days at a space velocity of 0.5 on the catalyst (1.2 WHSV on the zeolite), whereas the alumina-free, self-bound catalyst reached the selected EOC temperature only after 235 days. At comparable space velocities (LHSV) on the catalyst, a cycle extension of about 12 times is obtained (curves A, B and D).

In a second dewaxing cycle after air regeneration, using the same feed and dewaxing conditions, the aging rate was approximately 0.5° F./day (0.3° C./day) at 0.5 LHSV and 1.3° F./day (0.7° C./day) at 0.85 LHSV. This higher value of the space velocity is approximately the same WHSV on zeolite corresponding to 0.5 LHSV for a 65/35 ZSM-5 Al$_2$O$_3$ catalyst which ages at 7°-8° F./day (3.8°-4/4° C./day) with the same feed at 0.5 LHSV.

The dewaxing operation was run for 180 days at 0.5 LHSV and for 30 days at 0.85 LHSV (equivalent in terms of oil processed to 51 days at 0.5 LHSV, to give an equivalent of 231 days total at 0.5 LHSV). The EOC temperature was only 650° F. (343° C.) as compared to 675° F. (357° C.) on the first cycle. After 30 days at 0.85 LHSV the rate was dropped again to 0.5 and a lighter feed was processed for 29 days at 1.0 LHSV to an EOC temperature of 673° F. (356° C.).

FIG. 1 clearly shows that the binder-free catalyst ages more slowly than the alumina-bound catalyst even when the process rate (LHSV) over the alumina-bound catalyst is reduced by 50 percent to make the ratio of oil to zeolite 10 percent less than it was with the unbound catalyst. These results were obtained regardless of the fact that the alumina-bound catalyst had been prepared in a manner known to be most suitable in other respects for the feedstock being processed.

EXAMPLE 3

Aging studies similar to those reported in Example 2 were carried out with an Arab Light Bright Stock.

The feed was dewaxed to 20° F. (−7° C.) pour point over ZSM-5 dewaxing catalyst at 400 psig (2860 kPa abs.) 2500 SCF/bbl (445 n.l.l.$^{-1}$H$_2$, using three extruded dewaxing catalysts with a zeolite component of comparable alpha value. The extrudates were 1/32 inch (0.8 mm) cylindrical extrudates of unsteamed, alumina-bound ZSM-5 (65% ZSM-5) and 1/16 inch (1.6 mm) cylindrical extrudates of the same catalyst. The self-bound catalyst of comparable initial activity was used in the form of 1/25 inch (1 mm) cylindrical extrudates.

Figure 2:
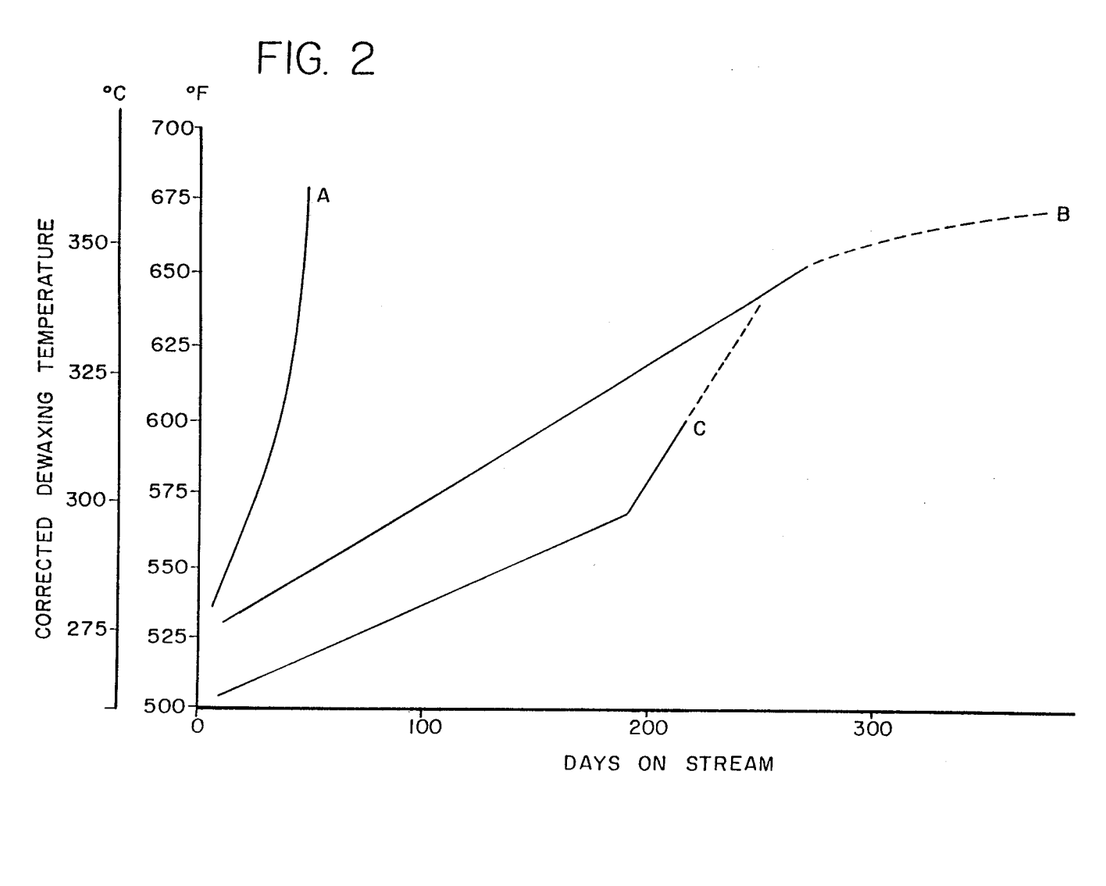

The results are shown in FIG. 2 which indicates the corrected dewaxing temperature to achieve a 20° F. (−7° C.) pour point. The self-bound catalyst (curve B) has a significant cycle length advantage based on volume of catalyst (uncorrected LHSV). Upon correcting for zeolite content and based on LHSV a 10–33 percent improvement in initial aging rate (below 600° F., about 325° C.) is found for the self-bound catalyst. The aging rate comparison is 0.5° F./day (0.3° C./day) for the self-bound catalyst and 0.56°–0.75° F./day (0.30°–0.42° C./day) for the bound catalyst. Although comparable projected cycle lengths would be achieved, no aging "tail" is noted with the self-bound catalyst.

FIG. 2 shows that the self-bound catalyst ages slightly faster than the alumina-bound zeolite at temperatures up to about 560° F. (293° C.) at twice the space velocity but at higher temperatures the alumina bound catalyst ages significantly faster. In addition, the self-bound catalyst ages more slowly at temperatures above 630° F. (332° C.) and lasts longer. On a WHSV basis the alumina-bound catalyst was operated at 91 percent of that for the self-bound catalyst and its smaller particle diameter probably accounts for its apparently greater activity at temperatures up to 560° F. (293° C.). At the higher temperatures, however, the binder-free catalyst is clearly superior despite the conditions favoring the bound catalyst. This provides a further demonstration that the effect is not due to the relatively larger amount of zeolite in the binder-free catalyst or the low WHSV over the binder-free catalyst. The ability to use higher space velocities is a significant advantage to the refiner since it enables a given unit to have a greater throughput, thereby offering a potentially significant ecomonic advantage.

We claim:

1. A process for catalytic dewaxing of a waxy feed having a pour point of at least 100° F., containing at least 25 wt % paraffin hydrocarbons and having a basic nitrogen content of at least 100 ppm by contacting the feed with a dewaxing catalyst comprising a binder-free extrudate of an intermediate pore zeolite at a temperature of 500° to 700° F. and at a space velocity, LHSV of 0.25 to 1.5 hr−1 and wherein said binder free extrudate zeolite catalyst displays an aging rate which is at least 65% lower than the aging rate of a comparable, alumina bound zeolite dewaxing catalyst of the prior art used at identical process conditions and recovering a dewaxed feed as a product of the process.

2. A process according to claim 1 in which the feed has a basic nitrogen content of at least 200 ppmw.

3. A process according to claim 1 in which the intermediate pore size zeolite is ZSM-5.

4. A process according to claim 1 in which the dewaxing catalyst includes a metal component having hydrogenation activity.

5. The process of claim 1 wherein said binder free extrudate zeolite catalyst displays an aging rate which is at least 90% lower than the aging rate of a comparable, alumina bound zeolite dewaxing catalyst of the prior art used at identical process conditions.

* * * * *